United States Patent
Li et al.

(10) Patent No.: US 10,811,003 B2
(45) Date of Patent: Oct. 20, 2020

(54) LANGUAGE PHONETIC PROCESSING BASED ON FINE-GRAINED MAPPING OF PHONETIC COMPONENTS

(71) Applicant: International Business Machines Corporation, Armonk, NY (US)

(72) Inventors: Min Li, San Jose, CA (US); Yunyao Li, San Jose, CA (US); Marina D. Hailpern, San Jose, CA (US); Sara Noeman, October (EG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 16/177,180

(22) Filed: Oct. 31, 2018

(65) Prior Publication Data
US 2020/0135177 A1    Apr. 30, 2020

(51) Int. Cl.
*G06F 17/27*        (2006.01)
*G10L 15/187*       (2013.01)
(Continued)

(52) U.S. Cl.
CPC .......... *G10L 15/187* (2013.01); *G10L 15/005* (2013.01); *G10L 15/02* (2013.01); *G10L 2015/025* (2013.01)

(58) Field of Classification Search
CPC ..... G10L 15/187; G10L 15/005; G10L 15/02; G10L 2015/025; G06F 40/232; G06F 40/194; G06F 40/129
(Continued)

(56) References Cited

U.S. PATENT DOCUMENTS 7,881,525 B2    2/2011 Mattausch et al.

FOREIGN PATENT DOCUMENTS

| CN | 1059281 C | 12/2000 |
|---|---|---|
| CN | 101876856 B | 5/2013 |
| WO | 2015014287 A1 | 2/2015 |

OTHER PUBLICATIONS

Jingting, W., "Research Towards Chinese String Similarity Based on the Clustering Feature of Chinese Characters," Modern Library and Information Technology, 2011, OALib Journal, abstract only, 1 page, retrieved from http://www.oalib.com/paper/1468151#.WntBIYJG2Wv).

(Continued)

*Primary Examiner* — Thierry L Pham
(74) *Attorney, Agent, or Firm* — Zilka-Kotab, P.C.

(57) ABSTRACT

In one embodiment, a computer-implemented method includes obtaining a pronunciation of a first word of a particular language and identifying a phonetic component of the pronunciation. The method includes obtaining a phonetic component mapping table for the type of phonetic component identified in the pronunciation of the first word and assigning a phonetic value to the identified phonetic component using the phonetic component mapping table. For a second word, the method includes obtaining a pronunciation of a second word, identifying a phonetic component of the pronunciation, and assigning a phonetic value to the identified phonetic component. In addition, the method includes calculating a phonetic distance between the identified phonetic component of the first word and the identified phonetic component of the second word, using the assigned phonetic values of the respective identified phonetic components of the first word second word, and storing the calculated phonetic distance in a file.

21 Claims, 9 Drawing Sheets

(51) Int. Cl.
  *G10L 15/00* (2013.01)
  *G10L 15/02* (2006.01)
  *G06F 17/21* (2006.01)
(58) Field of Classification Search
  USPC .......................................................... 704/9
  See application file for complete search history.

(56) References Cited

OTHER PUBLICATIONS

Wikipedia, "Double Metaphone," Wikipedia, Mar. 2009, 2 pages, retrieved from http://taggedwiki.zubiaga.org/new_content/b59670217d126f461b45fbf42854b6b4.

Black, P., "double metaphone," Dictionary of Algorithms and Data Structures, May 2014, 1 page, retrieved from https://xlinux.nist.gov/dads/HTML/doubleMetaphone.html.

Kondrak, G., "Phonetic alignment and similarity," Kluwer Academic Publishers, 2003, pp. 1-20.

Navarro, G., "A Guided Tour to Approximate String Matching," ACM Computing Surveys, vol. 33, No. 1, Mar. 2001, pp. 31-88.

Voorhees et al., "The TREC-8 Question Answering Track," Trec, vol. 99, 1999, 8 pages.

Wu, Y., "Commonly used phonetic vocabulary," 2016, 6 pages, retrieved from http://www.51wendang.com/doc/97585e99067d692a1bbaec92.

Place of Articulation zh (30.0, 1.7)   z (30.0, 1.5)

ch (31.0, 1.7)   c (31.0, 1.5)

sh (33.0, 1.7)   s (31.0, 1.5)

Pronunciation Method

6 Groups of Vowels a (1.0, 0.0)    ia (0.0, 0.0)

an (1.0, 1.0)   ian (0.0, 1.0)

ang (1.0, 1.5)  iang (0.0, 1.5)

Pronunciation Method

600

Input : *Word w, Threshold th, Dict dict;*
Output: *Words outws;*
begin
   *pys* = getPinyins (*w,dict*) ;
   *headPys* =
     getSimPinyins(*pys*(0), *th*);
   *headWords* =
   getWordswithHeadPy(*headPys, dict*);
   for $cw \in$ *headWords* do
     if $cw.size \neq w.size$ then
       *continue*;
     end
     *sim* = getSimilarity ($cw,w$) ;
     if $sim \leq th$ then
       *outws.add*($cw$);
     end
   end
   sortByAscSim (*outws*) ;
   *return outws*;
end

FIG. 6

LANGUAGE PHONETIC PROCESSING BASED ON FINE-GRAINED MAPPING OF PHONETIC COMPONENTS

BACKGROUND

The present invention relates to phonetic processing of a specific language, and more specifically, this invention relates to language phonetic processing based on fine-grained mapping of phonetic components.

Phonetic similarity algorithms identify words and phrases with similar pronunciation which are used in many natural language processing tasks. However, existing approaches are designed mainly for Indo-European languages and fail to capture the unique properties of languages that are different from Indo-European languages, e.g., languages with written characters.

Performing the mental gymnastics of transforming "I'm hear" to "I'm here," or "I can't so buttons" to "I can't sew buttons," is familiar to anyone who has encountered auto-corrected text messages, puns in social media posts, or just friends with poor grammar. Although at first glance it may seem that phonetic similarity can only be quantified for audible words, this problem is often present in purely textual spaces, such as social media posts, text messages, etc. Incorrect homophones (i.e., same pronunciation, different meaning) and synophones (i.e., similar pronunciation, different meaning), whether used in error or in jest, pose challenges for a wide range of natural language processing (NLP) tasks, such as named entity identification, text normalization, transliteration, spelling correction, etc. It is challenging for these tasks to successfully transform incorrect words or phrases ("hear", "so") to the corresponding phonetically correct words or phrases ("here", "sew"). A robust representation of phonetic similarity between word pairs for any particular language is needed. A reliable approach for generating phonetically similar words is equally crucial for all languages.

Unfortunately, most existing phonetic similarity algorithms such as Soundex and Double Metaphone (DM) are motivated by English and designed for Indo-European languages. In these processes, words are encoded to approximate phonetic presentations by ignoring vowels (except foremost ones), which may be appropriate where phonetic transcription includes a sequence of phonemes, such as for English. In contrast, the speech sound of other languages may involve several parts. For example, the speech sound of a Chinese character is represented by a single syllable in Pinyin pronunciation having two or three parts: an initial (optional), a final or compound final, and tone (see Table 1).

TABLE 1

Example of Pinyins

| Pinyin | Initial | Final | Tone |
|---|---|---|---|
| xi1 | x | i | 1 |
| fan4 | f | an | 4 |

As an example of the complexity of other languages, Table 2 (below) shows two sentences from Chinese microblogs, containing informal words derived from phonetic transcription. The DM and Soundex encodings for the near-homonyms of the Pinyin pronunciation of the characters "xi2 huan1" (top line of Table 2) are shown in Table 3 (above). Since both DM and Soundex ignore vowels and tones, words with dissimilar pronunciations are incorrectly assigned to the same DM and Soundex encoding (e.g., xi1fan4 and xie4fen4), while true near-homonyms are encoded much further apart (e.g., xi1fan4 and xi2huan1). Thus, the phonetic algorithms of DM and Soundex do not rationally apply to languages with multiple components. It would be desirable to have a phonetic algorithim that may be adaptable to languages that have multiple components for sounds and pronunciation.

TABLE 2

Microblogs using phonetic transcription

喔 (ou2, 我 wo2) 稀饭 (xi1fan4, 喜欢 xi2huan1) 你.
I like you.
杯具 (bei1ju4, 悲剧 bei1ju4) 啊, 为一个女孩纸
(zhi2, 子 zi5) 这么伤沽 (xiang1gu1, 伤哭 xiang2ku1).
Sadly, I am heart broken for a girl.

TABLE 3

DM and Soundex of Chinese words

| Words | DM | Soundex |
|---|---|---|
| 稀 xi1 饭 fan4 | S:S, FN:FN | X000, F500 |
| 喜 xi2 欢 huan1 | S:S, HN:HN | X000, H500 |
| 泄 xie4 愤 fen4 | S:S, FN:FN | X000, F500 |

SUMMARY

In one embodiment, a computer-implemented method for determining a phonetic distance between two words of a particular language includes obtaining a pronunciation of a first word of a particular language and identifying a phonetic component of the pronunciation of the first word, where the phonetic component corresponds to a type of phonetic component of the particular language. The computer implemented method further includes obtaining a phonetic component mapping table for the type of phonetic component identified in the pronunciation of the first word and assigning a phonetic value to the identified phonetic component of the pronunciation of the first word, using the phonetic component mapping table. In addition, for a second word, the computer-implemented method continues with obtaining a pronunciation of a second word of the particular language, where the first word and the second word are different, identifying a phonetic component of the pronunciation of the second word, and assigning a phonetic value to the identified phonetic component of the second word using the phonetic component mapping table. In addition, the method includes calculating a phonetic distance between (i) the identified phonetic component of the first word and (ii) the identified phonetic component of the second word, using (a) the assigned phonetic value of the identified phonetic component of the first word and (b) the assigned phonetic value of the identified phonetic component of the second word, and storing the calculated phonetic distance in association with identified phonetic component of the first word.

In another embodiment, computer-implemented method for ranking a series of candidate words with pronunciation similar to that of a seed word includes obtaining a pronunciation of a seed word of a particular language and identifying a phonetic component of the pronunciation of the seed word, where the phonetic component corresponds to a type of phonetic component of the particular language. The computer-implemented method continues with obtaining a phonetic component mapping table for the type of phonetic component identified in the pronunciation of the seed word, assigning a phonetic value to the identified phonetic component using the phonetic component mapping table, obtaining a pronunciation of a given one of a plurality of candidate words of the particular language, identifying a phonetic component of the pronunciation of the given one of the plurality of candidate words, wherein the plurality of candidate words and the seed word are different, and assigning a phonetic value to the identified phonetic component using the phonetic component mapping table. For each type of phonetic component identified in the seed word, the computer-implemented method includes calculating a phonetic distance between (i) the identified phonetic component of the seed word and (ii) the identified phonetic component of the candidate word, using (a) the assigned phonetic value of the identified phonetic component of the seed word and (b) the assigned phonetic value of the identified phonetic component of the candidate word, determining a phonetic similarity distance between the seed word and the candidate word, where the phonetic similarity distance includes calculating a sum of a plurality of phonetic distances between the seed word and the candidate word, each phonetic distance representing a given type of phonetic component. Moreover, the computer-implemented method includes generating a series of candidate words, where each candidate word in the series of candidate words has a pronunciation similar to that of the seed word based on a value of the determined phonetic similarity distance between the seed word and each candidate word, and ranking the candidate words that have a pronunciation similar to the seed word in order of the value of the determined phonetic similarity distance between the seed word and each candidate word.

In yet another embodiment, a computer-implemented method for ranking a series of candidate words with pronunciation similar to that of a seed word, where the candidate words and the seed word are of the Chinese language, includes obtaining a Pinyin pronunciation of a seed word of the Chinese language, where the seed word is comprised of a series of characters, where each character has a Pinyin pronunciation. The computer-implemented method includes identifying a Pinyin phonetic component of the Pinyin pronunciation of one character of the seed word, where the Pinyin phonetic component is selected from the group of Pinyin phonetic components consisting of: an initial, a final, and a tone, and obtaining a Pinyin component mapping table selected from the group consisting of: a Pinyin initial mapping table, a Pinyin final mapping table, and a Pinyin tone mapping table. The computer-implemented method continues with assigning a phonetic value to the identified Pinyin phonetic component of the Pinyin pronunciation of the character of the seed word using the respective Pinyin phonetic component mapping table. Moreover, the computer-implemented method includes obtaining a Pinyin pronunciation of a given one of a plurality of candidate words of the Chinese language, wherein the given one of the candidate words is comprised of a series of characters, wherein each character has a Pinyin pronunciation, identifying a Pinyin phonetic component of the Pinyin pronunciation of a character of the given one of the candidate words, and assigning a phonetic value to the identified Pinyin phonetic component of the Pinyin pronunciation of the character using the respective Pinyin phonetic component mapping table. For each type of phonetic component identified in the character of the seed word, the computer-implemented method includes calculating a phonetic distance between (i) the identified Pinyin phonetic component of the character of the seed word and (ii) the identified Pinyin phonetic component of the character of the candidate word using (a) the assigned phonetic value of the identified Pinyin phonetic component of the character of the seed word and (b) the assigned phonetic value of the identified Pinyin phonetic component of the character of the candidate word, and determining a phonetic similarity distance between the seed word and the candidate word, where the phonetic similarity distance comprises calculating a sum of a plurality of phonetic distances between the seed word and the candidate word, each phonetic distance representing a given type of phonetic component. In addition, the computer-implemented method includes generating a series of candidate words, where each candidate word in the series of candidate words has a Pinyin pronunciation similar to that of the seed word based on a value of the determined phonetic similarity distance between the seed word and each candidate word, and ranking the candidate words that have a Pinyin pronunciation similar to the seed word in order of the value of the determined phonetic similarity distance between the seed word and each candidate word.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6 is an example of an algorithm for generating and ranking candidate words, in accordance with one embodiment.

DETAILED DESCRIPTION

Figure 1:
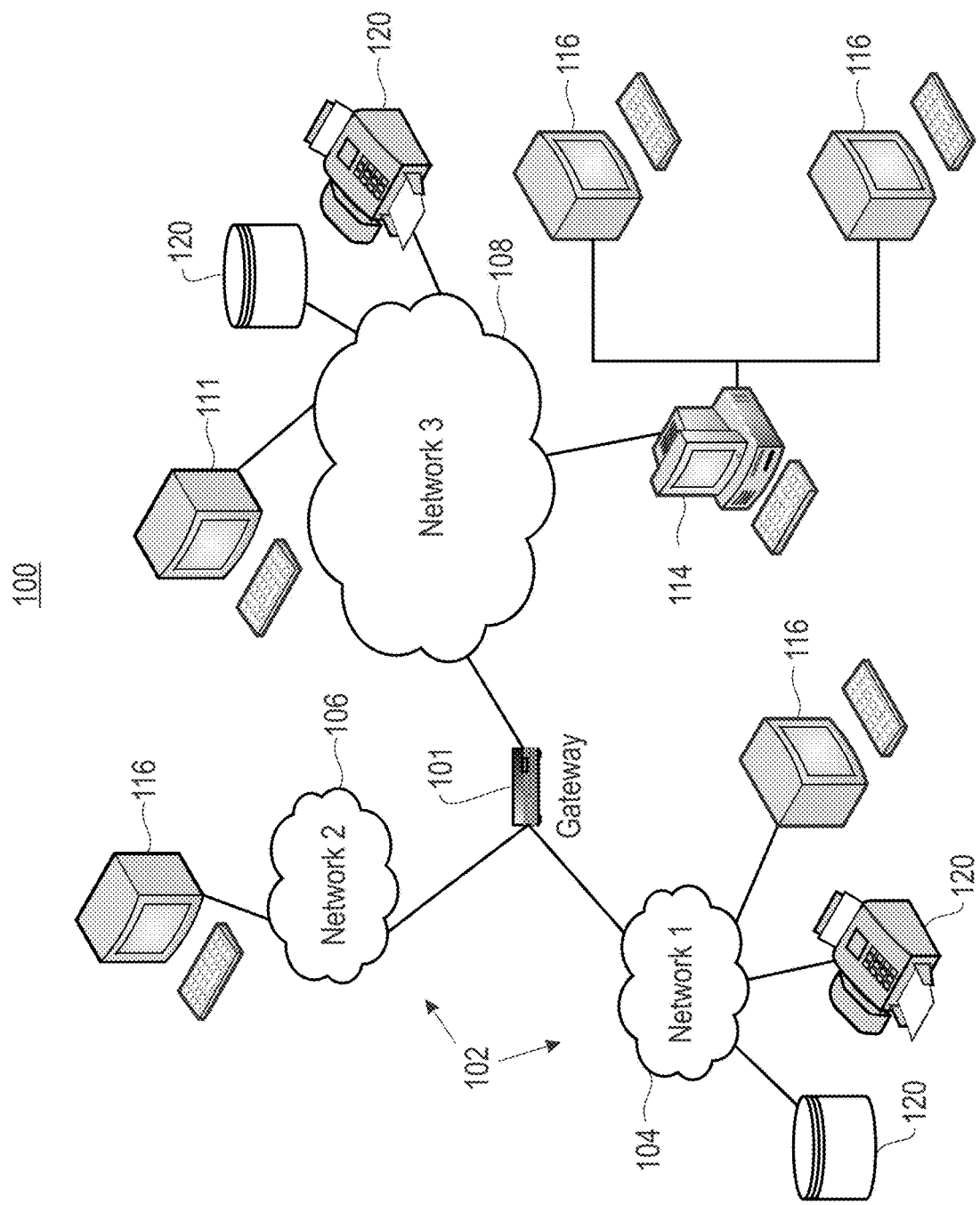
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for language phonetic processing based on fine-grained mapping of phonetic components.

In one general embodiment, a computer-implemented method for determining a phonetic distance between two words of a particular language includes obtaining a pronunciation of a first word of a particular language and identifying a phonetic component of the pronunciation of the first word, where the phonetic component corresponds to a type of phonetic component of the particular language. The computer implemented method further includes obtaining a phonetic component mapping table for the type of phonetic component identified in the pronunciation of the first word and assigning a phonetic value to the identified phonetic component of the pronunciation of the first word, using the phonetic component mapping table. In addition, for a second word, the computer-implemented method continues with obtaining a pronunciation of a second word of the particular language, where the first word and the second word are different, identifying a phonetic component of the pronunciation of the second word, and assigning a phonetic value to the identified phonetic component of the second word using the phonetic component mapping table. In addition, the method includes calculating a phonetic distance between (i) the identified phonetic component of the first word and (ii) the identified phonetic component of the second word, using (a) the assigned phonetic value of the identified phonetic component of the first word and (b) the assigned phonetic value of the identified phonetic component of the second word, and storing the calculated phonetic distance in association with identified phonetic component of the first word.

In another general embodiment, computer-implemented method for ranking a series of candidate words with pronunciation similar to that of a seed word includes obtaining a pronunciation of a seed word of a particular language and identifying a phonetic component of the pronunciation of the seed word, where the phonetic component corresponds to a type of phonetic component of the particular language. The computer-implemented method continues with obtaining a phonetic component mapping table for the type of phonetic component identified in the pronunciation of the seed word, assigning a phonetic value to the identified phonetic component using the phonetic component mapping table, obtaining a pronunciation of a given one of a plurality of candidate words of the particular language, where the plurality of candidate words and the seed word are different, identifying a phonetic component of the pronunciation of the given one of the plurality of candidate words, and assigning a phonetic value to the identified phonetic component using the phonetic component mapping table. For each type of phonetic component identified in the seed word, the computer-implemented method includes calculating a phonetic distance between (i) the identified phonetic component of the seed word and (ii) the identified phonetic component of the candidate word, using (a) the assigned phonetic value of the identified phonetic component of the seed word and (b) the assigned phonetic value of the identified phonetic component of the candidate word, determining a phonetic similarity distance between the seed word and the candidate word, where the phonetic similarity distance includes calculating a sum of a plurality of phonetic distances between the seed word and the candidate word, each phonetic distance representing a given type of phonetic component. Moreover, the computer-implemented method includes generating a series of candidate words, where each candidate word in the series of candidate words has a pronunciation similar to that of the seed word based on a value of the determined phonetic similarity distance between the seed word and each candidate word, and ranking the candidate words that have a pronunciation similar to the seed word in order of the value of the determined phonetic similarity distance between the seed word and each candidate word.

In yet another general embodiment, a computer-implemented method for ranking a series of candidate words with pronunciation similar to that of a seed word, where the candidate words and the seed word are of the Chinese language, includes obtaining a Pinyin pronunciation of a seed word of the Chinese language, where the seed word is comprised of a series of characters, where each character has a Pinyin pronunciation. The computer-implemented method includes identifying a Pinyin phonetic component of the Pinyin pronunciation of one character of the seed word, where the Pinyin phonetic component is selected from the group of Pinyin phonetic components consisting of: an initial, a final, and a tone, and obtaining a Pinyin component mapping table selected from the group consisting of: a Pinyin initial mapping table, a Pinyin final mapping table, and a Pinyin tone mapping table. The computer-implemented method continues with assigning a phonetic value to the identified Pinyin phonetic component of the Pinyin pronunciation of the character of the seed word using the respective Pinyin phonetic component mapping table. Moreover, the computer-implemented method includes obtaining a Pinyin pronunciation of a given one of a plurality of candidate words of the Chinese language, wherein the plurality of candidate words and the seed word are different, wherein the given one of the candidate words is comprised of a series of characters, wherein each character has a Pinyin pronunciation, identifying a Pinyin phonetic component of the Pinyin pronunciation of a character of the given one of the candidate words, and assigning a phonetic value to the identified Pinyin phonetic component of the Pinyin pronunciation of the character using the respective Pinyin phonetic component mapping table. For each type of phonetic component identified in the character of the seed word, the computer-implemented method includes calculating a phonetic distance between (i) the identified Pinyin phonetic component of the character of the seed word and (ii) the identified Pinyin phonetic component of the character of the candidate word using (a) the assigned phonetic value of the identified Pinyin phonetic component of the character of the seed word and (b) the assigned phonetic value of the identified Pinyin phonetic component of the character of the candidate word, and determining a phonetic similarity distance between the seed word and the candidate word, where the phonetic similarity distance comprises calculating a sum of a plurality of phonetic distances between the seed word and the candidate word, each phonetic distance representing a given type of phonetic component. In addition, the computer-implemented method includes generating a series of candidate words, where each candidate word in the series of candidate words has a Pinyin pronunciation similar to that of the seed word based on a value of the determined phonetic similarity distance between the seed word and each candidate word, and ranking the candidate words that have a Pinyin pronunciation similar to the seed word in order of the value of the determined phonetic similarity distance between the seed word and each candidate word.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
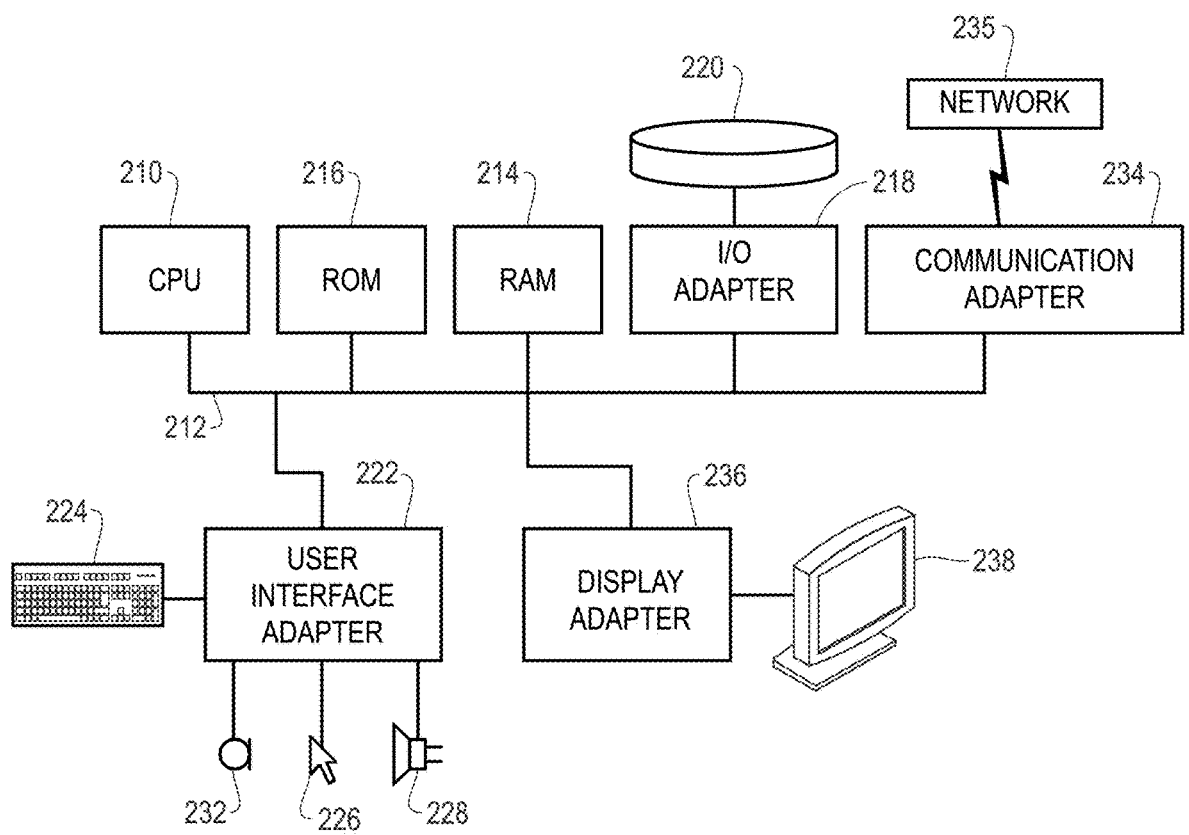
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Various embodiments described herein generate and rank candidate words in a particular language using fine grained phonetic component mapping tables. The phonetic component mapping tables encode phonetic components of a language (e.g., consonants, vowels, tones, etc.) into multiple dimensional numerical points that may define the pronunciation of words of the language. An nth dimension, depending on the rules of pronunciation of a particular language, may yield a more accurate representation of phonetic similarity between words of the particular language. Using the phonetic component mapping tables, a phonetic distance of similar phonetic components in two words being compared may be calculated.

Various embodiments described herein present a n-dimensional phonetic encoding for a particular language with a phonetic similarity algorithm. Moreover, the phonetic encoding of components of a word allows a list of similar words to be generated and ranked phonetically. In one approach, a computer-implemented program generates ranked candidate words with similar pronunciation to a seed word. Similarity may be measured by a phonetic distance metric based on n-dimensional encodings.

Figure 3:
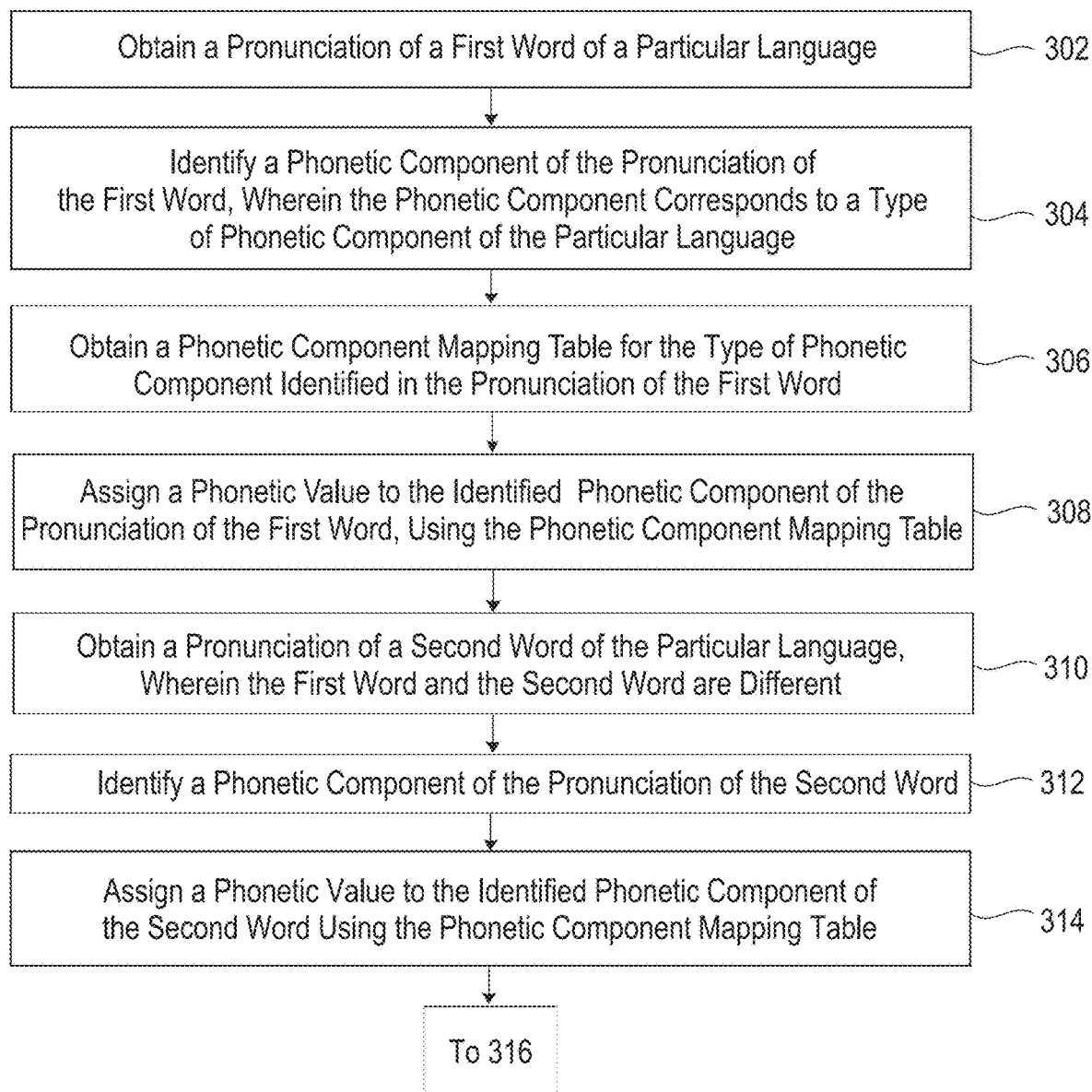
FIG. 3 depicts a flowchart of a method, in accordance with one embodiment.
Figure 3:
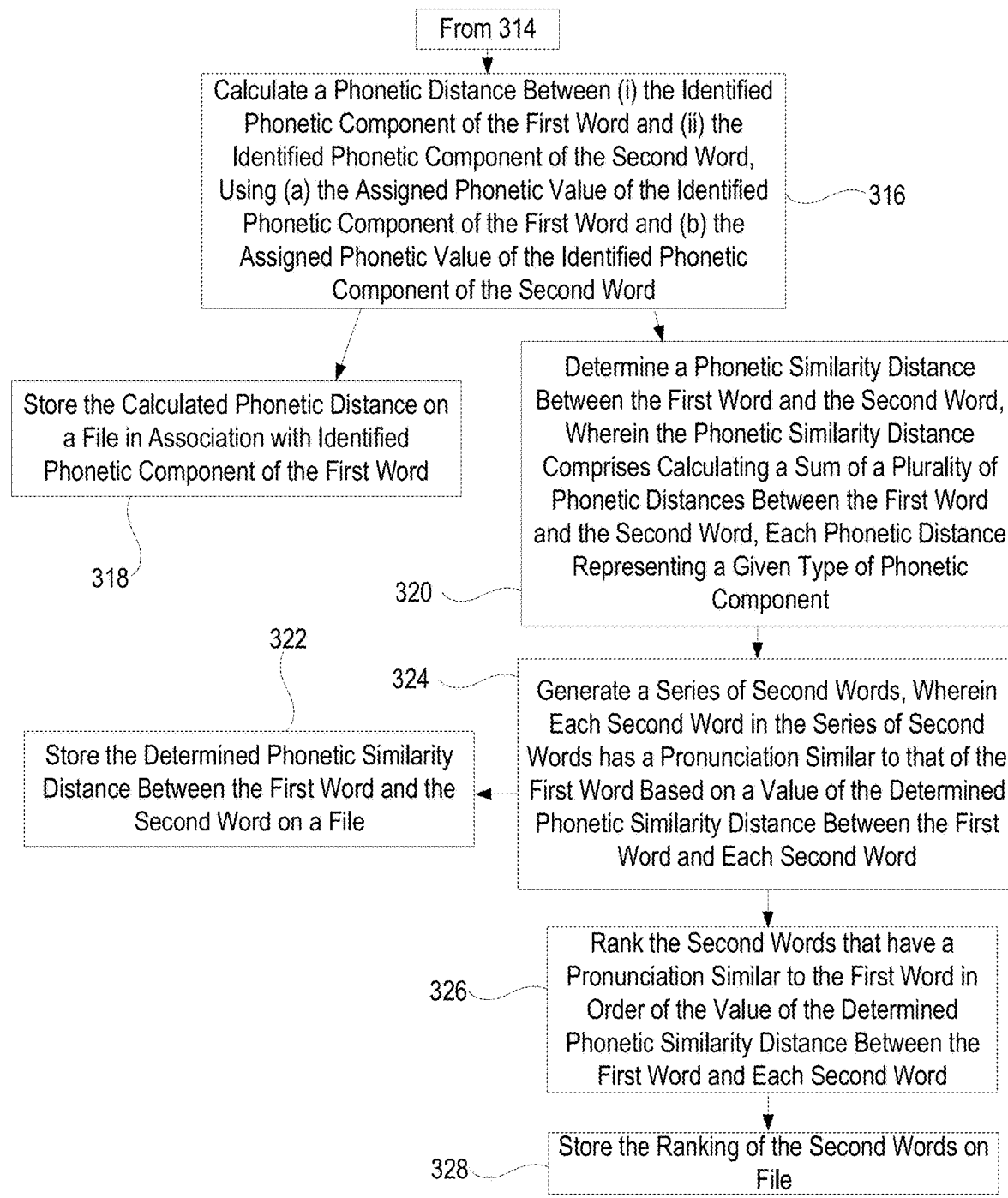

Now referring to FIG. 3, a flowchart of a method 300 is shown for determining a phonetic distance between two words of a particular language, according to one embodiment. The method 300 may be performed in accordance with the present invention in any of the environments depicted in FIGS. 1-9B, among others, in various embodiments. Of course, a greater or fewer number of operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art. For simplicity, and by way of example only, the method 300 is described below as being performed by a computer.

As shown in FIG. 3, method 300 includes operation 302, in which the computer obtains a pronunciation of a word of a particular language. In some approaches, a word or list of words may be obtained from a dictionary on the computer. In some approaches, a word or a list of words may be obtained from a remote location, e.g., social media, social server, etc. In some approaches, the word may be obtained from a textual script. In other approaches, the word may be a word provided by a speech-to-text program. In various approaches, the word or list of words may be obtained from any suitable source as would be understood by one skilled in the art.

In some approaches, a pronunciation of the provided word may be obtained from a dictionary. The computer may access a dictionary from the local computer. In other approaches, the dictionary may be remotely located from the computer. The computer may access a remote dictionary to obtain a pronunciation of a word.

In some approaches, the pronunciation of a first word (seed word, given word, etc.) may be in the form of a series of symbols. In other approaches, the pronunciation of a first word may be a digital sound of the word. In yet other approaches, the pronunciation of a first word may be in the form of a text version of the word. These approaches are by example and are not meant to be limiting in anyway.

Operation 304 includes the computer identifying a phonetic component of the pronunciation of the word, where the phonetic component corresponds to a type of phonetic component of the particular language. In some approaches, the phonetic component is predefined by rules corresponding to the language. In various approaches, a pronunciation of a word may include n portions of at least one unique phonetic component. The number n of portions of the pronunciation of a word may include different types of phonetic components. The different types of phonetic components are predefined by the rules of the language. In some languages, each portion of the pronunciation of the word may have different types of phonetic components. In some languages, each portion of a pronunciation of a word may include multiple types of phonetic components as predefined by the rules of the language. In some approaches, a language may have at least two different types of phonetic components.

In some approaches, the computer may receive the rules of a language and the different types of phonetic components associated with the language from an independent program. In some approaches, the computer may receive the rules of the language and the associated phonetic components from the language processing program described herein. In some approaches, the computer may access the rules of the language and the associated phonetic components from a source remotely located from the computer.

Operation 306 of method 300 includes obtaining a phonetic component mapping table for the type of phonetic component identified in the pronunciation of the word. In some approaches, the phonetic component mapping table may have a plurality of dimensions, the dimensions determined by the type of phonetic component of the particular language. Each dimension may represent a phonetic encoding characteristic of the type of phonetic component. Each dimension is divided into partitions with each partition corresponding to a variance of the phonetic encoding characteristic as defined by the rules of the language for the type of phonetic component.

In some approaches, the phonetic component mapping table has at least one dimension. For example, the phonetic component mapping table may have two dimensions. In yet other approaches, the phonetic component mapping table may have three dimensions. In yet other approaches, the phonetic component mapping table may have n dimensions, where n is an integer having a value up to the maximum number of dimensions relevant to the corresponding language.

In various approaches, each dimension may represent a phonetic encoding characteristic of the type of phonetic component. For example, and without meaning to be limiting in any way, a first dimension of a phonetic component mapping table may be the pronunciation of the phonetic component, and a second dimension of the phonetic mapping table may be the articulation of the phonetic component as defined by the rules of a particular language.

In some approaches, each dimension is divided into partitions with each partition corresponding to a variance of the phonetic encoding characteristic as defined by the rules of the language for the type of phonetic component. In some approaches, the phonetic components may be a specific aspect (e.g., component, syllable, consonant, vowel, etc.) of a portion of a word and the phonetic characteristic of these phonetic components may be the variation of pronunciation, variation of articulation relative to specific letters of the language, etc.

In various approaches, the phonetic components between words may be compared by their locations on a phonetic component mapping table specific for the phonetic component being compared.

For example, and not meant to be limiting in any way, in the English language a phonetic distance may be determined based on similar pronunciation of a letter. The letters with similar sounds, such as "m" and "n", "b" and "p" may be clustered together respectively on the mapping table and the phonetic distance between each such pair may be relatively small. However, for letters with different sounds such as "n" and "p," the phonetic distance between them would be relatively larger. Furthermore, a consonant and a vowel would not be interchangeable, such as "p" and "o" and, thus, the phonetic distance between them might almost be infinite, since "p" would not be substituted for "o" in any case.

In some approaches, the phonetic component mapping table for a particular language may be obtained from a source located remotely from the computer. In some approaches, the phonetic component mapping table may be obtained in simplified form; thereafter, the computer may build the phonetic component mapping table, possibly using, but not limited to, a machine learning approach, as words are obtained and processed. In some approaches, the computer may be programmed to initiate a unique phonetic component mapping table that is built according to specifications of the rules of a particular language.

According to one embodiment, each phonetic component mapping table may be formed using a learning approach to obtain encodings specific to the phonetic component represented on the phonetic component mapping table. A learning approach may include analyzing linguistic characteristics combined with a labeled dataset that includes word pairs with specific pairs of known phonetic components annotated for phonetic similarity. The set of annotated pairs between the phonetic components may be used to learn the n-dimensional encodings of each phonetic component. In further approaches, the annotated pairs may be used to generate phonetically similar candidates of words to compare to a given word.

Phonetically similar word pairs may be used to create annotations representing the phonetic similarity of the phonetic components.

In preferred approaches, the learning model of forming a phonetic component table may extend to any n-dimensional space. For instance, extending beyond one-dimension may yield more accurate encodings by actually quantifying the inter- and intra-cluster similarities of phonetic component clusters. In the case of some languages, when n=1, the n-dimensional learning model may collapse the coordinate space to one dimension. The predefined clusters of phonetic components may not be well-aligned in the one dimensional space, and many clusters may be mixed together.

Phonetically similar word pairs may be used to create annotations representing the phonetic similarities of the phonetic components. An initial threshold may be used to generate a comparison of pairs of words for comparing a given word (e.g., a first word); the initial threshold may include the following characteristics: distance locations of similar phonetic components on each phonetic component mapping table, length of common phonetic component sequence, length of word, etc.

From the list of comparison word pairs (generated from the initial applied threshold), a second threshold may be applied to generate word pairs that have a narrower difference between the words. The second threshold may include encodings of parts of words provided (e.g., annotated) by a different assessment method. For example, a second method of assessment for the second threshold may include native speakers of a particular language who label a representative set of word pairs for degree of phonetic similarity. The second threshold may fine-tune phonetic consonant mapping tables with the results of the second method of assessment thereby providing a best match of the annotations by the native speakers relative to phonetic similarity with the encoding of each consonant, vowel, phonetic component, etc. located on the respective phonetic component mapping table. The following factors (e.g., characteristics) may affect annotation: position of the phonetic component, word length, and combination of phonetic components.

The processes described herein preferably utilize machine learning to build phonetic component mapping tables, where each phonetic component mapping table is for mapping a unique phonetic component. As a process is used to generate and rank similar candidate words, portions of the words that may be partitioned by specific phonetic components of a particular language are mapped to a phonetic component mapping table specific for a unique phonetic component of the particular language.

Operation 308 of method 300 includes assigning a phonetic value to the identified phonetic component of the pronunciation of the word using the phonetic mapping table. In various approaches, each different type of phonetic component may be mapped to a phonetic component mapping table corresponding to that type of phonetic component. In some approaches, the phonetic value may be assigned to the identified phonetic component according to the location of the identified phonetic component on the phonetic component mapping table. The location of the identified phonetic component may be determined by the respective phonetic encoding characteristics of each dimension on the phonetic component mapping table.

For comparing the pronunciation of a first word to the pronunciation of a second word, operation 310 of method 300 includes obtaining a pronunciation of a second word of the particular language, where the first word and the second word are different. In some approaches, operation 310 includes obtaining a pronunciation of a given one of a plurality of second words of the particular language. Further, in some approaches, the plurality of second words and the first word are different.

Operation 312 includes identifying a phonetic component of the pronunciation of the second word. In some approaches, operation 312 includes identifying a phonetic component of the pronunciation of the given one of the plurality of second words.

Operation 314 includes assigning a phonetic value to the identified phonetic component of the second word using the phonetic component mapping table.

Operation 316 includes calculating a phonetic distance between (i) the identified phonetic component of the first word and (ii) the identified phonetic component of the second word, using (a) the assigned phonetic value of the identified phonetic component of the first word and (b) the assigned phonetic value of the identified phonetic component of the second word.

In one approach, operation 316 includes a computer comparing the pronunciation of two words based on the phonetic values of the corresponding phonetic components between the words.

In one approach, the first word (e.g., seed word, given word, etc.) may be replaced by a second word (e.g., candidate word, comparison word, etc.) during the comparing of second words, such that a particular second word may have a closer intended pronunciation and/or meaning as part of the phrase in use. For example, an input in a speech-to-text program may designate the first spoken word as a first word; however, as a series of second words are compared to the first word, using the method described herein, a specific second word may be ranked above the first word in terms of intended pronunciation and/or meaning of the word as part of the phrase being input into the program. Thus, the specific second word may then replace the initial first word (and the initial first word may now be designated "a second word"), and the program continues with a list of new second words to compare to the new first word.

In some approaches, operation 316 includes calculating a distance between the location of each identified phonetic component of the first word and the location of the corresponding phonetic component of the second word according to the phonetic component mapping table corresponding to the identified phonetic component.

In one approach, operation 318 of method 300 (continued in FIG. 3) includes storing the calculated phonetic distance in association with the identified phonetic component of the first word. The stored calculated phonetic distance may be usable for determining the phonetic difference in terms of phonetic similarity distance, between all phonetic components of the first word and the second word. In some applications, these stored calculated phonetic distances may be accessed as word options for speech-to-text word programs.

In one approach, after operation 316 of calculating a phonetic distance between the identified phonetic component of the first word and the identified phonetic component of the second word, method 300 continues with operation 320 of determining a phonetic similarity distance between the first word and the second word. In various approaches, the first word may be a seed word, a given word, etc. and may be initially obtained (in operation 302) as the word provided to compare its pronunciation to the pronunciation of other words, the other words being a second word, a candidate word, a comparing word, etc. In some approaches, the second word may be one word in a series of second words obtained to compare pronunciations to the first word.

In operation 320, the phonetic similarity distance comprises calculating a sum of a plurality of phonetic distances between the first word and the second word, each phonetic distance representing a given type of phonetic component.

According to one approach, a computer-implemented method may obtain a given word w and a candidate word w' each comprising a number of portions c, c' of the word, and each $i^{th}$ portion $c_i$ (in which K is the total number of portions) may be comprised of phonetic components, for example X, Y, Z, etc. In the rules of some languages there may be two types of phonetic components. In the rules of other languages, there may be more than three types of phonetic components. In various approaches the rules of a particular language will define the number of different types of phonetic components.

The phonetic similarity S between the pronunciation of each portion $c_i$ of the given word w and the corresponding portion $c_i'$ of the candidate word w' may be calculated using a formula (e.g., Manhattan distance model as the sum of the distances between three pairs of components) as follows, where p represents the assigned phonetic value:

$$\sum_{1 \leq i \leq K} S(c_i, c_i') = \sum_{1 \leq i \leq K} \{S_p(p_{c_i}^X, p_{c_i'}^X) + S_p(p_{c_i}^Y, p_{c_i'}^Y) + S_p(p_{c_i}^Z, p_{c_i'}^Z)\}$$

Equation 1

For instance, using a Manhattan distance formula as a model allows each of the three phonetic components to be considered independently of the other two components. Any single change of one component does not affect more than that one component. Any change affecting several components is the result of multiple independent and additive changes. The similarity of two words, w and w', may be computed as the sum of the phonetic distances of each corresponding portion. Moreover, the formula of Equation 1 allows the distance of any number of phonetic components between two words to be compared, as may be defined by a particular language. Equation 1 shows three phonetic components, X, Y, and Z, but this is by way of example only and is not meant to be limiting in any way; a particular language may have few than three phonetic component or may have greater than three phonetic components.

In one approach, operation 322 may include storing the determined phonetic similarity distance between the first word and the second word on a file. The file may be stored on a computer, external storage space, external drive, etc.

In one approach, operation 324 includes generating a series of second words (e.g., candidate words) where each second word in the series of second words has a pronunciation similar to that of the first word based on a value of the determined phonetic similarity distance between the first word and each second word.

In some approaches, the generated list of second words may be within a similarity threshold. The similarity threshold may be set to generate a number of second words in the range of about 5 words to about 100 words, or any range therebetween. In some approaches, the similarity threshold may be set to generate a number of second words in the range of about 50 words to about 100 words. In some approaches the similarity threshold may be set to generate a number of second words in the range of about 20 words to about 50 words. In other approaches, the similarity threshold may be set to generate a number of second words in the range of about 10 to 50 words. These ranges for similarity threshold are by way of example only and are not meant to be limiting in any way.

In one approach, for a given word w, a similarity threshold th may be configured to limit the number of similar phonetic pronunciation within the threshold th to the given word w. The similarity of each candidate word w' (e.g., second word, comparison word) to the given word w may be calculated using Equation 1. Candidate words w' that fall outside the similarity threshold th may be filtered out of the list of candidate words. The similarity threshold th may be a parameter that affects the precision and recall of the generated candidates. A larger th may generate more candidates, increasing recall while decreasing precision. A smaller th may generate fewer candidates with increasing precision. In various embodiments, a similarity threshold may be defined by a particular language.

Operation 326 of method 300 includes ranking the second words that have a pronunciation similar to the first word in order of the value of the determined phonetic similarity distance between the first word and each second word. In various approaches, using the phonetic component mapping table and Equation 1 for computing the phonetic similarity between words, a series of candidate words (e.g., second words) may be generated that are similar to a given word (e.g., first word). Furthermore, a program may rank the series of candidate words with similarity to the given word according to the similarity difference to the given word.

In some approaches, operation 328 of method 300 includes storing the ranked second words (that have similar pronunciation to the first word) in a file, database, table, etc. In some approaches, the ranked second words may be considered immediately following obtaining the first word. In some approaches, the ranked second words may be considered immediately and subsequently stored for building a database via machine learning processes within the program. In some approaches, the ranked second words to a first word may be accessed from a file when a repeat instance of the first word is obtained. In some approaches, the ranked second words may be considered as replacements for the first word.

In some approaches, the method 300 is incorporated into a process of machine learning to build a database of similar word pronunciations for a particular language. In some approaches, the ranked second words may be used in a program for determining the grammar, meaning, sense, etc. of the word in a given phrase.

The file, database, table, etc. may then be used by processes and applications such as an autocorrect process, a spell checking process, a machine translation application, a voice recognition application, a speech-to-text application, a text input recognition application, etc.

The Language of Chinese

In one approach, the process described herein may be applied to the language of Chinese. Pinyin is the official romanization system for the standard Chinese language on mainland China and provides four diacritics for denoting tones of the Chinese language. In the Chinese language, each word may include a series of written characters (e.g., more than one character), each character of each word having at least one of the following Pinyin phonetic components: an initial, a final, and a tone. In some approaches, a Pinyin pronunciation of a character may have at least an initial and a tone and a final phonetic component may be optional.

Determining phonetic similarities between words in Pinyin pronunciation of the language of Chinese offers many challenges. The perceptually distinct units of sound (i.e., phenome) in the Chinese language that distinguish one word from another convey only partial information about the word, while the smallest meaningful contrastive unit (i.e., grapheme) of a written Chinese character may convey other information for the same word. Moreover, an average of seven Chinese characters may share the same Pinyin sound. Several Chinese characters may share a similar pronunciation. A phonetic similarity of Chinese characters is derived from varying a Pinyin phonetic component while fixing other Pinyin components.

Figures 4A, 4B, 4C:
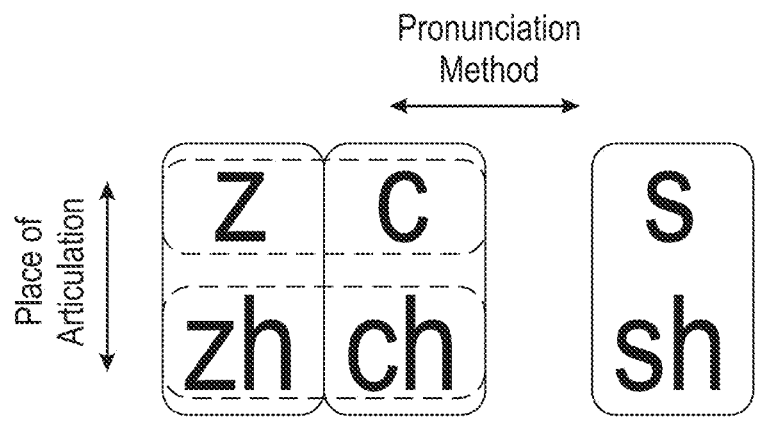
FIG. 4A is an example of a subset from a phonetic component mapping table, in accordance with one embodiment.
FIG. 4B is an example of a subset of an initial phonetic component mapping table, in accordance with one embodiment.
FIG. 4C is an example of a subset of a final phonetic component mapping table, in accordance with one embodiment.

As described herein, each phonetic component may have an independent phonetic mapping table. In one approach, as for the Pinyin Chinese language, each of the phonetic components of Pinyin, such as an initial, a final, and a tone, have an independent phonetic mapping table. FIG. 4A illustrates the similarities of a subset of Pinyin initials. Initial groups "z, c", "zh, ch", "z, zh", and "zh, ch" are all similar, which could not be captured using a one dimensional representation. Furthermore, manually assigning a single numeric to encode and derive phonetic similarity does not capture the complexities of pronunciations of Pinyin components. For example, an encoding of "zh=0, z=1, c=2, ch=3" fails to identify the "zh, ch" pair as similar. Therefore, given the nature of determining phonetic similarity between words in particular languages, it is critical to learn the distances between phonetic components based on as much empirical data as possible rather than using a manually encoded metric.

In some approaches, a phonetic component mapping table of the initials may include two dimensions. One dimension may represent the place of articulation, e.g., "zh z j", "ch c q", "sh s x", etc. The second dimension may represent the pronunciation method, e.g., "bp", "dt", "gk", "hf", "nfr", jqx", "zc", "zh ch". FIG. 4B illustrates a portion of a phonetic component mapping table of the Pinyin initials. If, on the other hand, an initial phonetic component mapping table included only one dimension, the initials would be in a single line and thus, each sound would be close, or very likely, clustered on top of one another. Thus, a multiple dimension for a phonetic component mapping table provides a fine-grained mapping of the phonetics of a component. As shown in FIG. 4B, a phonetic component "z" may have a location with a relatively short distance from other phonetic sounds with a similar pronunciation method, such as "c" and "s". Moreover, in the dimension representing place of articulation, "z" is a relatively short distance from the phonetic component "zh". And further, "z" may be mapped relatively close to the phonetic component "ch", a sound that is not as near as "zh" or "c" to "z" but closer than other phonetic components located on the initial phonetic component mapping table.

Moreover, the fine-grained phonetic component mapping tables provide phonetic values for each location on the mapping table. For example, in FIG. 4B, a character of a given word has an initial phonetic component "z" that may be mapped on the partially shown initial phonetic component mapping table and assigned relative value (30.0, 1.5), and a candidate word has a similar character having an initial phonetic component "s" that has been mapped to have an assigned relative value of (33.0, 1.5), thereby allowing the distance between these two initial phonetic components to be quantified using these values.

In some approaches, a phonetic component mapping table of the finals includes two dimensions, as illustrated in FIG. 4C. As shown, one dimension of the phonetic component mapping table of the finals represents the six basic vowels, and the second dimension represents methods of pronunciation for each vowel group. In one dimension the final phonetic components are partitioned into the six basic vowels (e.g., a o e i u v). The second dimension may include the nasal compound of the vowels together with "a an ang", and other factors as would be defined by the rules of the final phonetic components of the Chinese language. Thus, by mapping a final phonetic component to a fine-grained two-dimensional final phonetic component mapping table, a final pronunciation may be considered in terms of sharing essential vowels, sharing rhyming vowels, and the pronunciation method following nasal consonants "n" or "ng", as an example.

Moreover, a comparison of a final phonetic component between two words (having a character of similar pronunciation) may be calculated using a fine-grained final phonetic component mapping table as partially shown in FIG. 4C. For example, a character of a given word has a final phonetic component "a" that may be mapped on the partially shown final phonetic component mapping table and assigned relative value (1.0, 0.0), and a candidate word has a similar character having a final phonetic component "ian" that has been mapped to have an assigned relative value of (0.0, 1.0), thereby allowing the distance between these two final phonetic components to be quantified using these values.

As described herein, one approach allows the three phonetic components of Pinyin to be independently phonetically compared. For example, the phonetic similarity of the finals "ie" and "ue" is identical in the Pinyin pairs {"xie2", "xue2"} and {"lie2", "lue2"}, in spite of the varying initials. In sharp contrast, English does not have this characteristic. For example, in English, the letter group "ough," is pronounced differently in "rough", "through" and "though."

However, depending on the initials, a final of the same written form may represent different finals. For instance, ü is written as u after j, q and x; uo is written as o after b, p, m f, or w. There are a total six written rules of Pinyin, and these rules may be represented in the phonetic mapping tables as described herein.

For example, consider the example of the Pinyin pronunciation of the Chinese language, in which each word is comprised of a series of characters, such that each character may be comprised of three phonetic components: initial, final, and tone. As one example, the Pinyin of two words, w and w', are "tong2xie2" and "tong2xue2", and the distance between the first character of each word is zero (tong2 and tong2). For example, to compute the phonetic similarity of the second characters of each word, the formula of Equation 1 may be used:

$$S(xie2,xue2)=S_P(x,x)+S_P(ie,ue)+S_T(2,2)$$

Thus, although the second character appears completely different for each word, xie2 for w compared to xue2 for w', the combined distance in the second character is computed as having a difference only in the Pinyin finals, $S_p$(ie, ue).

In one embodiment, method 300 as shown in FIG. 3 may be applied to the Chinese language. Now referring to FIG. 5, a schematic representation of a method 500 is shown processing words of the Chinese language having similar pronunciation, according to one embodiment. The method 500 may be performed in accordance with the present invention in any of the environments depicted in FIGS. 1-9, among others, in various embodiments. Of course, greater or fewer number of operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Figure 5:
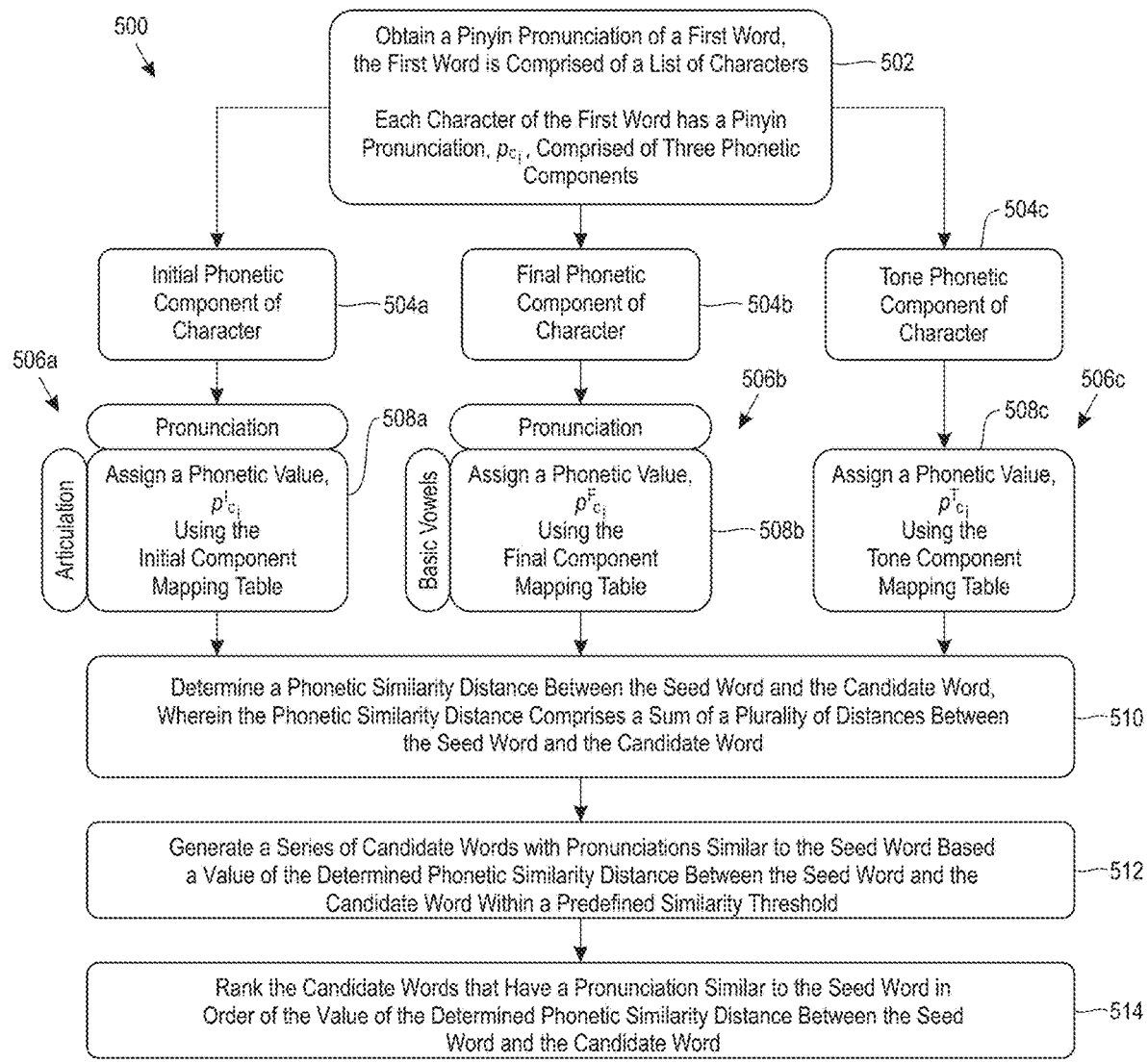
FIG. 5 is a schematic drawing of a method, in accordance with one embodiment.

As shown in FIG. 5, method 500 includes operation 502 in which a Pinyin pronunciation of a seed word is obtained. The word may be a given word (e.g., seed word, first word) obtained from a program. In some approaches, the word may be a candidate word to compare to other words with similar pronunciation. In some approaches the word may be obtained from a speech-to-text program. In some approaches, the word having a Pinyin pronunciation may be comprised of a series of characters of the Chinese language (e.g., the word may include two characters, the word may include three characters, etc.). Each character of the word has a Pinyin pronunciation of at least one of these following phonetic components: an initial, a final, and a tone.

The next operation of method 500 includes identifying at least one phonetic component of the Pinyin pronunciation of the word. In some approaches, the operation includes identifying at least one phonetic component of the Pinyin pronunciation of a character of the word. As shown in FIG. 5, operation 504a identifies an initial phonetic component of the given character, operation 504b identifies a final phonetic component of the given character, and operation 504c identifies a tone phonetic component of the given character.

The next operation includes obtaining a Pinyin phonetic component mapping table for each phonetic component as defined by the rules of the Chinese language. Each phonetic component mapping table includes at least one dimension to map a location of the phonetic location of the phonetic component of the character.

As shown, operation 506a of method 500 includes obtaining a Pinyin initial phonetic component mapping table where each initial phonetic component of the character may be partitioned into a location based on at least two dimensions. In some approaches, one dimension of the Pinyin initial phonetic component mapping table is based on pronunciation of the initial phonetic component, and the second dimension is based on articulation of the initial phonetic component.

As shown, operation 506b of method 500 includes obtaining a Pinyin final phonetic component mapping table where each final phonetic component of the character may be partitioned into a location based on at least two dimensions. In some approaches, one dimension of the Pinyin final phonetic component mapping table is based on six vowels (e.g., basic vowels) of the final phonetic component, and the second dimension is based on pronunciation with nasal consonants of the final phonetic component. In some approaches, operation 506b may be optional in characters that may not have a final phonetic component.

As shown, operation 506c of method 500 includes obtaining a Pinyin tone phonetic component mapping table where each tone phonetic component of the character may be partitioned into a location based on at least one dimension.

Operation 508a includes assigning a phonetic value $p^I c_i$ to the identified initial phonetic component of each $i_{th}$ character using the Pinyin initial phonetic component mapping table.

Operation 508b includes assigning a phonetic value $p^F c_i$ to the identified final phonetic component of each $i_{th}$ character using the Pinyin final phonetic component mapping table.

Operation 508c includes assigning a phonetic value $p^T c_i$ to the identified tone of each $i_{th}$ character using the tone phonetic component mapping table.

Operation 510 of method 500 includes obtaining a Pinyin pronunciation of one of a plurality of candidate words (e.g., second word, comparison word, etc.) of the Chinese language, where the candidate word is comprised of a series of characters. The plurality of candidate words and the seed word are different. Each character of the candidate word has a Pinyin pronunciation. Operation 510 further includes identifying a Pinyin phonetic component of the Pinyin pronunciation of a character of the candidate word and assigning a phonetic value to the identified Pinyin phonetic component of the Pinyin pronunciation of the character of the candidate word using the respective Pinyin phonetic component mapping table.

For each type of phonetic component identified in the character of the seed word, operation 510 includes calculating a phonetic distance between (i) the identified Pinyin phonetic component of the character of the seed word and (ii) the identified Pinyin phonetic component of the character of the candidate word using (a) the assigned phonetic value of the identified Pinyin phonetic component of the character of the seed word and (b) the assigned phonetic value of the identified Pinyin phonetic component of the character of the candidate word.

Operation 510 continues with determining a phonetic similarity distance between the seed word and the candidate word. The phonetic similarity distance includes calculating a sum of a plurality of phonetic distances between the seed word and the candidate word, each phonetic distance representing a given type of phonetic component.

For each candidate word, a phonetic similarity distance S is calculated of the Pinyin pronunciation of a seed word w to a Pinyin pronunciation of a candidate word $w_i$, using the phonetic value of each phonetic component of the seed word and a phonetic component of each corresponding phonetic component of the candidate word, using the following formula in Equation 2:

$$\sum_{1 \leq i \leq K} S(c_i, c'_i) = \qquad \text{Equation 2}$$

-continued $$\sum_{1 \le i \le K} \{S_p(p_{c_i}^I, p_{c_i'}^I) + S_p(p_{c_i}^F, p_{c_i'}^F) + S_p(p_{c_i}^T, p_{c_i'}^T)\}$$

wherein K is a total number of characters (e.g., portions) c, c' of the seed word and the candidate word, respectively. The $i^{th}$ character $c_i$, $c_i'$ may include at least one of the following phonetic components: Pinyin phonetic component initial I, Pinyin phonetic component final F, and Pinyin phonetic component tone T. As shown in Equation 2, the phonetic similarity $S_p$ of each unique phonetic component (I, F, T) includes a difference between a phonetic value p of the $i^{th}$ portion $c_i$ of the seed word corresponding to a phonetic value p of the $i^{th}$ portion $c_i'$ of the candidate word.

Operation 512 includes generating a series (e.g., list, group, etc.) of candidate words (e.g., second words) where each candidate word in the series of candidate words has a Pinyin pronunciation similar to that of the seed word based on a value of the determined phonetic similarity distance between the seed word and each candidate word. In some approaches, the generated list of candidate words may be within a similarity threshold. In some approaches, the similarity threshold may be configured to generate a number of candidate words in the range of about 50 words to about 100 words.

Operation 514 of method 500 includes ranking the candidate words w' that have a Pinyin pronunciation similar to the seed word w in order of the value of the determined phonetic similarity distance S between the seed word and each candidate word. In some approaches, the series of candidate words, w', within the similarity threshold th may be ranked in ascending order by similarity difference to the seed word w. In various approaches, a program forms a list of candidate words (e.g., second words) that are phonetically close to the seed word (e.g., given word, first word, etc.) and the list of candidate words may be ranked according to the calculated similarity difference of each candidate word to the seed word in ascending order of similarity. For example, words with the smallest similarity distance are ranked higher and closer to the seed word.

As shown by way of example in FIG. 6, an algorithm 600 may be used for operation 512 for generating candidate words (e.g., second words) in Pinyin Chinese that are similar to a given Pinyin Chinese word (e.g., first word). The algorithm 600 may generate a list of candidate words that have a pronunciation similar to that of the given word.

In addition, the algorithm 600 includes operation 514 of ranking the series of candidate words according to the phonetic similarity of any one of the candidate words to the given word.

In one approach, for a given word w, a similarity threshold th, and a dictionary dict, a list of candidate words, w', with similar phonetic pronunciation within the threshold th to the given word w may be created.

The similarity of each candidate word w' to the given word w may be calculated using Equation 1. Candidate words w' that fall outside the similarity threshold th may be filtered out of the list of candidate words. The similarity threshold th may be a parameter that affects the precision and recall of the generated candidates. A larger th may generate more candidates, increasing recall while decreasing precision. A smaller th may generate fewer candidates with increasing precision.

Evaluation

One embodiment of the method described herein, Dimensional Similarity (DS) for Pinyin Chinese language, was compared to conventional language algorithms. 350 words were collected form social media, and each word was annotated with one to three phonetically similar words. A community-maintained dictionary mapped characters of each word to Pinyin phonetic pronunciations. DS was compared with Double Metaphone (DM), ALINE, and Minimum Edit Distance (MED) in terms of precision (P), recall (R), and Mean Reciprocal Rank (MRR). The y-axis represents the normalized values representing Recall and MRR.

The DM method is limited to considering word spelling, pronunciation, and other miscellaneous characteristics to encode the words, and thus was designated as the baseline evaluation. In addition, the evaluation included a modified DM method that included the ranking method described herein applied to the DM method to create a second baseline DM-rank. The third evaluation baseline included the ALINE method that measured phonetic similarity based on manually coded multi-valued articulatory features weighted by their relative importance with respect to feature salience. MED, the fourth evaluation baseline, computed similarity as the minimum weight series of edit operations that transforms one sound component into another.

The Effectiveness of the Method Described Herein (DS)

Figure 7A:
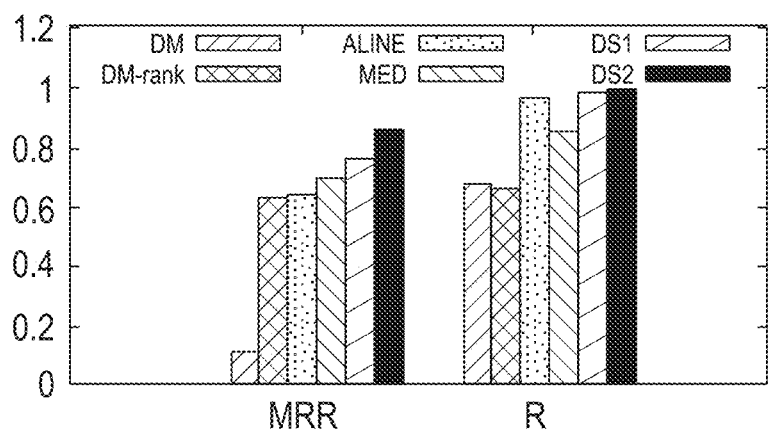
FIG. 7A is a graph of the effectiveness of recall for various methods.

One embodiment of the method described herein DS was compared to DM, DM-rank, ALINE and MED. The method described herein was evaluated at one dimension (n=1) as DS1 and two dimensions (n=2) as DS2. As shown in FIG. 7A, DS2 showed improved recall (R) compared to each baseline method, DM, DM-rank, and MED. The DM process is designed for English, and thus did not accurately reflect Chinese pronunciation.

The comparison of mean reciprocal rank (MRR) of each method showed that DS2 outperformed all the other methods. Ranking the DM candidates (DM-rank) using DS phonetic distance defined in Equation 1 improved the average MRR by a factor of 5.5, but was outperformed by the simple MED baseline, thereby indicating a possibly inherent problem with DM's coarse encodings. While ALINE had a similar recall to DS, ALINE was outperformed by DS2 on MRR possibly due to the direct representation of compound vowels for Pinyin. ALINE measures the distance between compound vowels using phonetic features of basic vowels which may lead to inaccuracy. In turn, MED demonstrated inconsistent accurate phonetic distances between initials, since most initials have a length 1 and the edit distance between any two characters of length 1 would be identical, according to the MED method. In contrast, DS encodes initials and final separately; thus, even a 1-dimensional encoding (DS1) outperformed the other baseline methods. Furthermore, two-dimensional DS outperformed one-dimensional DS in terms of MRR.

Figure 7B:
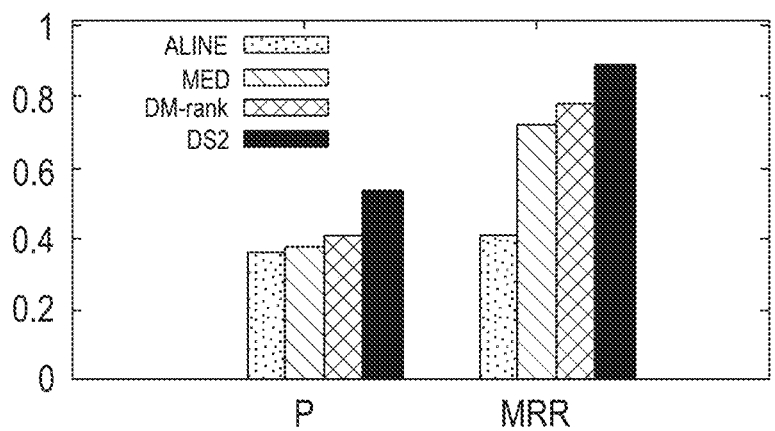
FIG. 7B is a graph of the effectiveness of precision for various methods.

The quality of the candidate ranking using each method was evaluated. FIG. 7B shows a comparison of the baseline methods to DS in terms of precision and MRR. The candidate rankings were evaluated by individuals having fluent native Chinese language skills. The quality of the top 5 generated similar candidate words for each seed word (where there were 100 seed words) was annotated for comparison between ranking methods. The candidate words were annotated by marking the candidate word as similar to the seed word (1) or not (0), and then marking one candidate as being most similar sounding (2) to the seed word. Precision was computed and average MRR was obtained from the annotations for each set of words.

As shown in FIG. 7B, DS outperformed each method assessed, ALINE, MED, and DM-rank, respectively, in terms of precision and associated MRR. Thus, the DS method demonstrated the highest precision of ranking the most phonetically similar candidates, compared to the other methods evaluated.

Evaluating Multiple Encoding Dimensions

Figure 8:
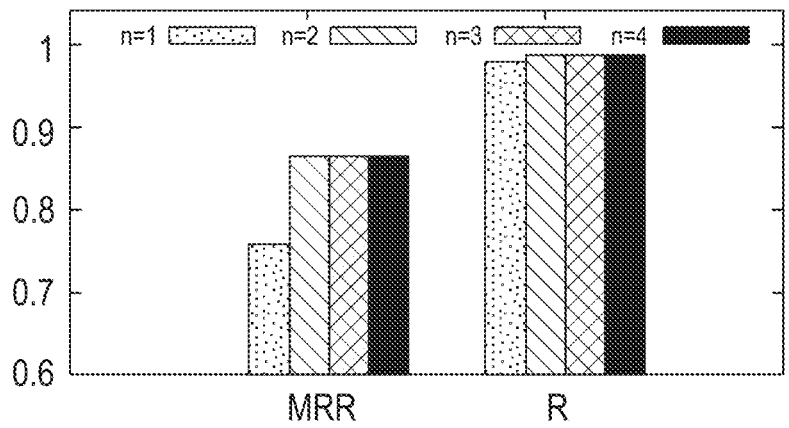
FIG. 8 is a graph of the effectiveness of encoding phonetic components in multiple dimensions, in accordance with one embodiment.

One embodiment of the method described herein, DS, was evaluated for encoding phonetic components in multiple dimensions. As shown in FIG. 7A, encoding initials and finals into a two-dimensional space was more effective than a one-dimensional space. FIG. 8 depicts the results of continuing to increase the number of dimensions, n=3 and n=4. It was observed that the Recall (R) for each was similar for all variations successfully able to identify the words. For the average MRR, the expansion to two dimensions from one dimension increased the average MRR. However, increasing the number of dimensions to greater than 2 did not significantly improve the average MRR. These results indicated that a two-dimensional encoding is sufficient to capture the phonetic relationship between Pinyin components.

Impact of Distance Threshold, th

Figure 9A:
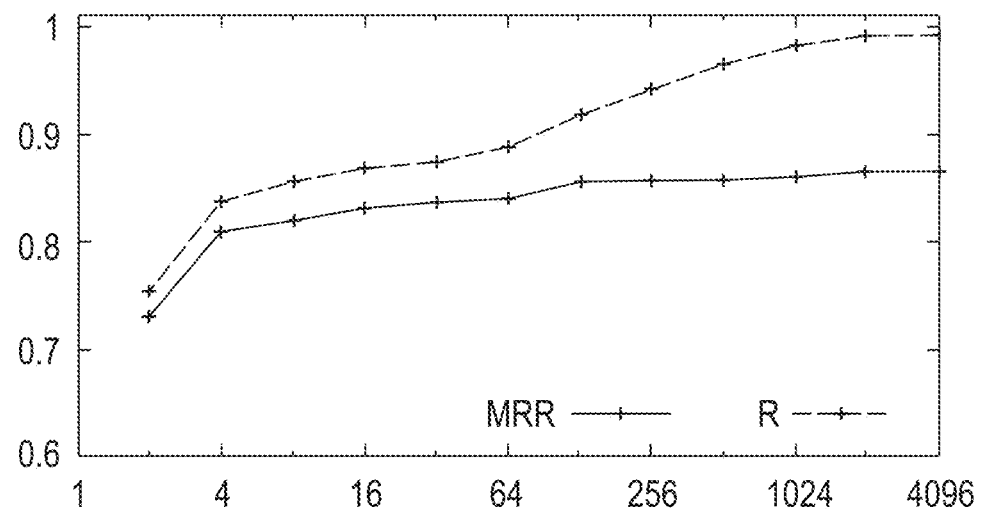
FIG. 9A is a plot of the effectiveness of increasing threshold on Recall, in accordance with one embodiment.

The impact of the similarity distance threshold th on the DS method, according to one embodiment, was examined by varying th from 2 to 4096. FIG. 9A shows the results of Recall (dashed line) compared to MRR (solid line) with an increasing threshold th of numbers of words. The y-axis represents normalized values.

Looking at the Recall (R) values, as the threshold th increased, the recall values increased and eventually converged when th reached 2048. By increasing th, DS matched more characters that were similar to the first character of a given word, which increased the number of candidates within the distance. Thus, the probability increased of including the "gold standard" words with greatest phonetic similarity.

The MMR values were less affected by increasing the threshold th. As shown in FIG. 9A, the MMR values (solid line) converged when th reached 128. However, the generated set of candidate words were too few for th<128; thus, to ensure both high recall and MRR, th=2500 is preferred for the DS method.

Impact of Number of Candidate Similar Words

Figure 9B:
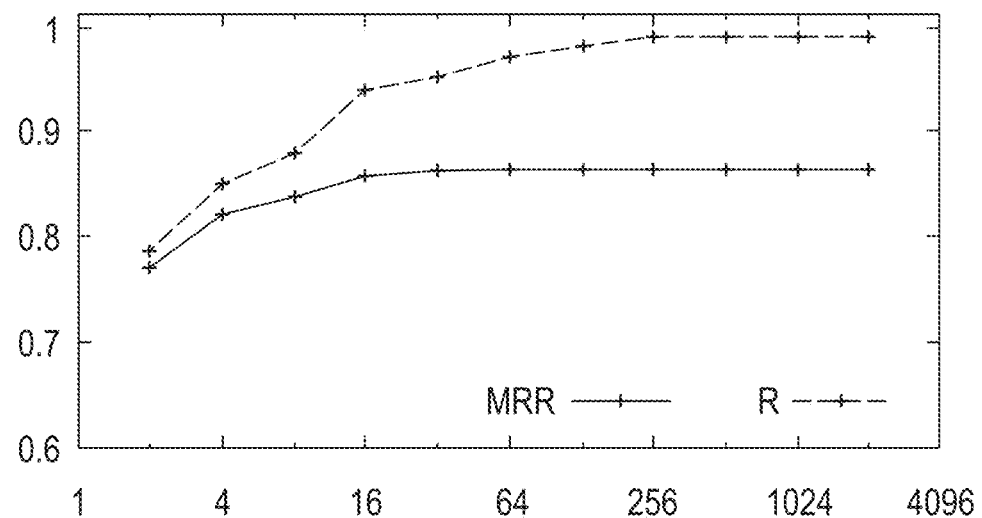
FIG. 9B is a plot of the effectiveness of an increasing number of candidate words on Recall, in accordance with one embodiment.

Adjusting the method to generate more candidate similar words improves recall, although presenting too many candidates to the downstream application may not be desirable. Thus, the impact of varying the upper limit of the number of generated candidate similar words was studied, where $n_c$ varying from 2 to 2048 words. FIG. 9B shows, in terms of normalized values (y-axis), the trend of recall (R, dashed line) and MRR (solid line) with an increasing the number of generated candidate words $n_c$ (x-axis).

As depicted in FIG. 9B, the MRR converged at 64 candidate words, whereas recall did not converge until about 256 candidate words. However, a reasonable limit may be set with an upper limit of 64 candidate words as FIG. 9B shows nearly 98% recall with 64 words.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for determining a phonetic distance between two words of a particular language, the computer-implemented method comprising:
   obtaining a pronunciation of a first word of a particular language;
   identifying a phonetic component of the pronunciation of the first word, wherein the phonetic component corresponds to a type of phonetic component of the particular language;
   obtaining a phonetic component mapping table for the type of phonetic component identified in the pronunciation of the first word;
   assigning a phonetic value to the identified phonetic component using the phonetic component mapping table;
   obtaining a pronunciation of a second word of the particular language, wherein the first word and the second word are different;
   identifying a phonetic component of the pronunciation of the second word;
   assigning a phonetic value to the identified phonetic component of the second word using the phonetic component mapping table;
   calculating a phonetic distance between (i) the identified phonetic component of the first word and (ii) the identified phonetic component of the second word, using (a) the assigned phonetic value of the identified phonetic component of the first word and (b) the assigned phonetic value of the identified phonetic component of the second word; and
   storing the calculated phonetic distance in association with the identified phonetic component of the first word.

2. The computer-implemented method of claim 1, wherein the phonetic component mapping table has a plurality of dimensions, the dimensions determined by the type of phonetic component of the particular language,
   wherein each dimension represents a phonetic encoding characteristic of the type of phonetic component,
   wherein each dimension is divided into partitions, each partition corresponding to a variance of the phonetic encoding characteristic as defined by the rules of the language for the type of phonetic component.

3. The computer-implemented method of claim 1, comprising,
   determining a phonetic similarity distance between the first word and the second word, wherein the phonetic similarity distance comprises calculating a sum of a plurality of phonetic distances between the first word and the second word, each phonetic distance representing a given type of phonetic component.

4. The computer-implemented method of claim 1, wherein the particular language has at least two different types of phonetic components.

5. The computer-implemented method of claim 4, wherein each different type of phonetic component is mapped to a phonetic component mapping table corresponding to that type of phonetic component.

6. The computer-implemented method of claim 4, wherein the pronunciation of the first word has a plurality of phonetic components, wherein each of the plurality of phonetic components is one of the at least two different types of phonetic components of the particular language.

7. A computer-implemented method for ranking a series of candidate words with pronunciation similar to that of a seed word, the computer-implemented method comprising:
obtaining a pronunciation of a seed word of a particular language;
identifying a phonetic component of the pronunciation of the seed word, wherein the phonetic component corresponds to a type of phonetic component of the particular language;
obtaining a phonetic component mapping table for the type of phonetic component identified in the pronunciation of the seed word,
assigning a phonetic value to the identified phonetic component using the phonetic component mapping table;
obtaining a pronunciation of a given one of a plurality of candidate words of the particular language, wherein the plurality of candidate words and the seed word are different;
identifying a phonetic component of the pronunciation of the given one of the plurality of candidate words;
assigning a phonetic value to the identified phonetic component using the phonetic component mapping table;
for each type of phonetic component identified in the seed word, calculating a phonetic distance between (i) the identified phonetic component of the seed word and (ii) the identified phonetic component of the candidate word, using (a) the assigned phonetic value of the identified phonetic component of the seed word and (b) the assigned phonetic value of the identified phonetic component of the candidate word;
determining a phonetic similarity distance between the seed word and the candidate word,
wherein the phonetic similarity distance comprises calculating a sum of a plurality of phonetic distances between the seed word and the candidate word, each phonetic distance representing a given type of phonetic component;
generating a series of candidate words, wherein each candidate word in the series of candidate words has a pronunciation similar to that of the seed word based on a value of the determined phonetic similarity distance between the seed word and each candidate word; and
ranking the candidate words that have a pronunciation similar to the seed word in order of the value of the determined phonetic similarity distance between the seed word and each candidate word.

8. The computer-implemented method of claim 7, wherein the phonetic component mapping table has a plurality of dimensions, the dimensions determined by the type of phonetic component of the particular language,
wherein each dimension represents a phonetic encoding characteristic of the type of phonetic component,
wherein each dimension is divided into partitions, each partition corresponding to a variance of the phonetic encoding characteristic as defined by the rules of the language for the type of phonetic component.

9. The computer-implemented method of claim 8, wherein the phonetic value is assigned to the identified phonetic component according to the location of the identified phonetic component on the phonetic component mapping table,
wherein the location of the identified phonetic component is determined by the respective phonetic encoding characteristics of each dimension on the phonetic component mapping table.

10. The computer-implemented method of claim 7, wherein the particular language has at least two different types of phonetic components.

11. The computer-implemented method of claim 7, wherein the pronunciation of the seed word is comprised of portions having at least one phonetic component.

12. The computer-implemented method of claim 11, wherein the pronunciation of the seed word has a plurality of portions, wherein each portion of the seed word has at least two different types of phonetic components of the particular language.

13. The computer-implemented method of claim 7, wherein the phonetic similarity distance S is calculated according to the formula:

$$\sum_{1 \le i \le K} S(c_i, c_i') = \sum_{1 \le i \le K} \{S_p(p_{c_i}^X, p_{c_i'}^X) + S_p(p_{c_i}^Y, p_{c_i'}^Y) + S_p(p_{c_i}^Z, p_{c_i'}^Z)\}$$

wherein K is the total number of portions c, c' of the seed word and the candidate word, respectively,
wherein an $i^{th}$ portion $c_i$, $c_i'$ is comprised a phonetic component X, Y, Z,
wherein a phonetic distance $S_p$ of the phonetic component comprises difference between (a) the assigned phonetic value p of the phonetic component of the $i^{th}$ portion $c_i$ of the seed word and (b) the assigned phonetic value p of the phonetic component of the $i^{th}$ portion $c_i'$ of the candidate word.

14. The computer-implemented method of claim 7, wherein the generated series of candidate words is within a similarity threshold.

15. The computer-implemented method of claim 14, wherein the similarity threshold is set to generate a number of candidate words in the range of 10 words to 100 words.

16. The computer-implemented method of claim 7, wherein the language is Chinese.

17. The computer-implemented method of claim 16, wherein a Chinese word is comprised of a series of Chinese characters, each Chinese character having at least one Pinyin phonetic component selected from the group of components consisting of: an initial, a final, and a tone.

18. The computer-implemented method of claim 17, wherein the phonetic similarity distance between the seed word and the candidate word is calculated using the following formula:

$$\sum_{1 \le i \le K} S(c_i, c_i') = \sum_{1 \le i \le K} \{S_p(p_{c_i}^I, p_{c_i'}^I) + S_p(p_{c_i}^F, p_{c_i'}^F) + S_p(p_{c_i}^T, p_{c_i'}^T)\}$$

wherein K is the total number of portions c, c' of the seed word and the candidate word, respectively, wherein an $i^{th}$ portion $c_i$, $c_i'$ is comprised of the following Pinyin phonetic components: Pinyin initial I, Pinyin final F, and tone T, wherein a phonetic distance $S_p$ of each Pinyin phonetic component comprises the difference between (a) an assigned phonetic value p of the Pinyin phonetic component of the $i^{th}$ portion $c_i$ of the seed word and (b) an assigned phonetic value p of the Pinyin phonetic component of the $i^{th}$ portion $c_i'$ of the candidate word.

19. A computer program product for ranking a series of candidate words with pronunciation similar to that of a seed word, the computer program product comprising a computer readable storage medium having program instructions embodied therewith, wherein the computer readable storage medium is not a transitory signal per se, the program instructions executable by a computer to cause the computer to perform a method comprising:

obtaining, by computer, a pronunciation of a seed word of a particular language;

identifying, by computer, a phonetic component of the pronunciation of the seed word, wherein the phonetic component corresponds to a type of phonetic component of the particular language;

obtaining, by computer, a phonetic component mapping table for the type of phonetic component identified in the pronunciation of the seed word;

assigning, by computer, a phonetic value to the identified phonetic component using the phonetic component mapping table;

obtaining, by computer, a pronunciation of a given one of a plurality of candidate words of the particular language, wherein the plurality of candidate words and the seed word are different;

identifying, by computer, a phonetic component of the pronunciation of the given one of a plurality of candidate words;

assigning, by computer, a phonetic value to the identified phonetic component using the phonetic component mapping table;

for each type of phonetic component identified in the seed word, calculating, by computer, a phonetic distance between (i) the identified phonetic component of the seed word and (ii) the identified phonetic component of the candidate word, using (a) the assigned phonetic value of the identified phonetic component of the seed word and (b) the assigned phonetic value of the identified phonetic component of the candidate word;

determining, by computer, a phonetic similarity distance between the seed word and the candidate word, wherein the phonetic similarity distance comprises calculating a sum of a plurality of phonetic distances between the seed word and the candidate word, each phonetic distance representing a given type of phonetic component;

generating, by computer, a series of candidate words, wherein each candidate word in the series of candidate words has a pronunciation similar to that of the seed word based on a value of the determined phonetic similarity distance between the seed word and each candidate word; and ranking, by computer, the candidate words that have a pronunciation similar to the seed word in order of the value of the determined phonetic similarity distance between the seed word and each candidate word.

20. A computer-implemented method for ranking a series of candidate words with pronunciation similar to that of a seed word, wherein the candidate words and the seed word are of the Chinese language, the computer-implemented method comprising:

obtaining a Pinyin pronunciation of a seed word of the Chinese language,
wherein the seed word is comprised of a series of characters,
wherein each character has a Pinyin pronunciation;

identifying a Pinyin phonetic component of the Pinyin pronunciation of one character of the seed word,
wherein the Pinyin phonetic component is selected from the group of Pinyin phonetic components consisting of: an initial, a final, and a tone;

obtaining a Pinyin component mapping table selected from the group consisting of: a Pinyin initial mapping table, a Pinyin final mapping table, and a Pinyin tone mapping table;

assigning a phonetic value to the identified Pinyin phonetic component of the Pinyin pronunciation of the character of the seed word using the respective Pinyin phonetic component mapping table;

obtaining a Pinyin pronunciation of a given one of a plurality of candidate words of the Chinese language, wherein the given one of the candidate words is comprised of a series of characters, wherein each character has a Pinyin pronunciation;

identifying a Pinyin phonetic component of the Pinyin pronunciation of a character of the given one of the candidate words;

assigning a phonetic value to the identified Pinyin phonetic component of the Pinyin pronunciation of the character using the respective Pinyin phonetic component mapping table;

for each type of phonetic component identified in the character of the seed word, calculating a phonetic distance between (i) the identified Pinyin phonetic component of the character of the seed word and (ii) the identified Pinyin phonetic component of the character of the candidate word using (a) the assigned phonetic value of the identified Pinyin phonetic component of the character of the seed word and (b) the assigned phonetic value of the identified Pinyin phonetic component of the character of the candidate word;

determining a phonetic similarity distance between the seed word and the candidate word,
wherein the phonetic similarity distance comprises calculating a sum of a plurality of phonetic distances between the seed word and the candidate word, each phonetic distance representing a given type of phonetic component;

generating a series of candidate words, wherein each candidate word in the series of candidate words has a Pinyin pronunciation similar to that of the seed word based on a value of the determined phonetic similarity distance between the seed word and each candidate word; and ranking the candidate words that have a Pinyin pronunciation similar to the seed word in order of the value of the determined phonetic similarity distance between the seed word and each candidate word.

21. The computer-implemented method of claim 20, wherein the phonetic similarity distance between the seed word and the candidate word is calculated using the following formula:

$$\sum_{1\le i\le K} S(c_i, c'_i) = \sum_{1\le i\le K} \{S_p(p^I_{c_i}, p^I_{c'_i}) + S_p(p^F_{c_i}, p^F_{c'_i}) + S_p(p^T_{c_i}, p^T_{c'_i})\}$$

wherein K is the total number of characters c, c' of the seed word and the candidate word, respectively, wherein an $i^{th}$ character $c_i$, $c_i'$ is comprised of the following Pinyin phonetic components: Pinyin initial I, Pinyin final F, and Pinyin tone T, wherein a phonetic distance $S_p$ of each Pinyin phonetic component comprises a difference between (a) the assigned phonetic value p of the Pinyin phonetic component of the $i^{th}$ character $c_i$ of the seed word and (b) the assigned phonetic value p of the corresponding Pinyin phonetic component of the $i^{th}$ character $c_i'$ of the candidate word.

\* \* \* \* \*